Aug. 1, 1961 W. E. COFFER 2,994,858
SYSTEM FOR SIGNALLING FAILURE OF REFRIGERATION DEVICES
Filed Dec. 13, 1957
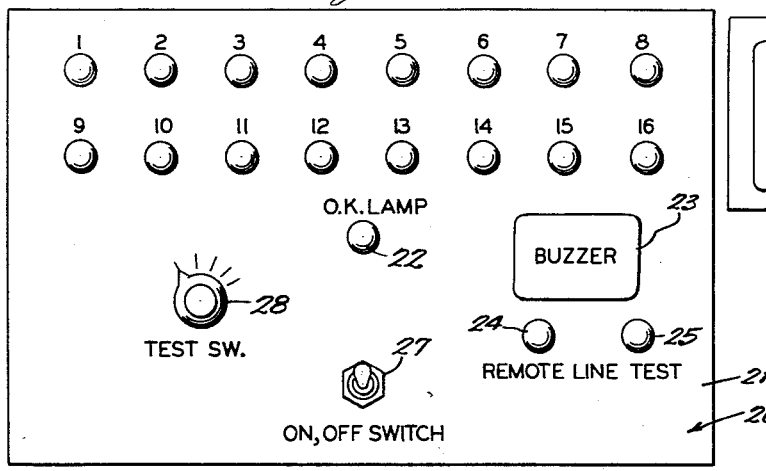
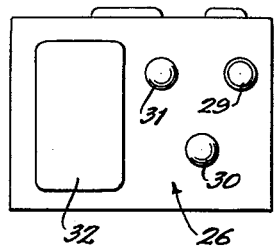
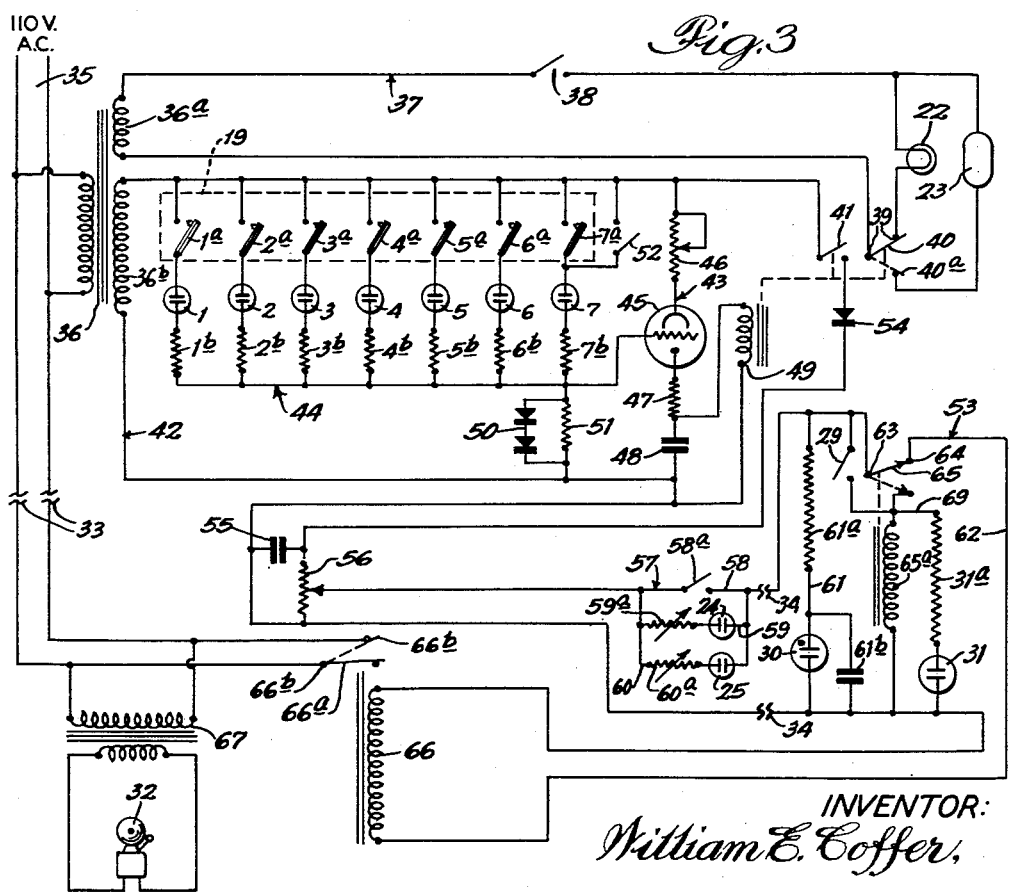
INVENTOR:
William E. Coffer,
BY Dawson, Tilton, Fallon & Lungmus,
ATTORNEYS.

United States Patent Office

2,994,858
Patented Aug. 1, 1961

2,994,858
SYSTEM FOR SIGNALLING FAILURE OF REFRIGERATION DEVICES
William E. Coffer, R.R. 5, Valparaiso, Ind.
Filed Dec. 13, 1957, Ser. No. 702,613
3 Claims. (Cl. 340—227)

This invention relates to a signal system, and more specifically, to a system for providing warning signals when dangerously high temperature conditions exist in any of a group of cold storage cabinets.

The invention is particularly suitable for use in large super markets where substantial quantities of frozen or refrigerated foods are kept in a number of cold storage cabinets. A serious problem confronting owners of such stores concerns the breakdown of the freezers or refrigerators since ordinarily the inoperativeness of such units is not detected until the maximum operating temperature has been greatly exceeded and, in the case of food freezers, the frozen foods have begun to thaw. Since frozen foods must not be re-frozen after they have once thawed, it is apparent that great quantities of food may be rendered unmarketable when a breakdown of any of the multiple freezer units occurs.

In this connection, it should be observed that such breakdowns frequently occur at night, or during weekends or holidays, when the super market is closed. In an effort to reduce the consequences of a freezer breakdown occurring at such times, store owners often make it a practice to visit the store during closing hours in order to detect failure in freezer operation and, if possible, to make the necessary repairs or move the food articles from the defective unit before substantial food damage results.

One of the principal objects of the present invention is to provide a signal system which overcomes the aforementioned disadvantages and inconveniences of the existing practice. Another object is to provide a signal system which not only produces a local signal within the store upon the failure of any of a group of food refrigerating units, but which also utilizes the lines of telephone or telegraph companies to produce a signal in a remote location, such as in some central station or in the home of the store owner. A further object is to provide a highly dependable signal system which not only indicates when the temperature of a freezer or refrigerating device has exceeded a preselected maximum operating temperature, but which also indicates the particular unit of a group which has failed. In this regard, it is also a specific object to provide a reliable signal system in which the signal elements for registering freezer failure are inoperative until such a failure has occurred, and in which means are provided for checking the operability of the various elements of the system and the integrity of the electric circuits.

Other objects will appear from the specification and drawings in which:

FIGURE 1 is an elevational view of a cabinet or control panel housing the circuit components which initiate a signal upon a unit failure, the front face of the cabinet being a monitor board;

FIGURE 2 is an elevation view of a smaller cabinet intended to be located at a position remote from the cabinet shown in FIGURE 1 and which receives a signal therefrom; and FIGURE 3 is a diagram of the circuits housed within the cabinets shown in FIGURES 1 and 2.

In the illustration given the numeral 20 generally designates the main cabinet located convenient to the site of the various units whose failure is to be indicated. For example, in the case of a super market, cabinet 20 may be located in the manager's office or in some other convenient location within the store. The front face 21 of cabinet 20 is provided with a number of signal lights designated by the numerals 1–16 which consist of neon glow tubes. It is intended that when the particular units with which the tubes 1–16 are associated are properly operating, the tubes will not glow. While the monitor board 21 is shown with the requisite number of tubes necessary for indicating the inoperability of sixteen freezer or refrigerating units, it will be understood that a greater or lesser number of units may be monitored by employing a corresponding number of tubes.

The numeral 22 designates a light bulb which is continuously lit when all of the units monitored are in operative condition. Whenever one or more of the units fails, the lamp 22 ceases to be illuminated and a buzzer 23 is caused to sound, thereby giving an aural indication that one or more of the units is inoperative. The numerals 24 and 25 designate neon glow tubes which are employed to test the operability of the transmission line extending between the main cabinet shown in FIGURE 1 and the remote cabinet designated in FIGURE 2 by the numeral 26.

The main or local cabinet 20 is also provided with a master or on-off switch 27 and a test switch 28 having a plurality of positions. The remote unit 26 is equipped with a push button switch 29, a pair of neon glow tubes 30, 31, and a buzzer 32, the functions of which will appear hereinafter.

A unit failure reported by the main monitoring cabinet 20 by the illumination of one or more glow tubes 1–16, the ringing of buzzer 23, and the switching off of lamp 22, will likewise be reported at the remote cabinet 26 by glow tube 30 flashing intermittently and buzzer 32 ringing. When both the visual and aural signals have been received at the remote station, it is possible to discontinue the aural signal by depressing button 29 which stops buzzer 32 but, in turn illuminates glow tube 31.

The electronic circuit responsible for the foregoing operation is shown schematically in FIGURE 3. With the exception of the elements enclosed within the broken lines 19, the upper portion of the illustrated circuit is housed within the main cabinet 20 while the lower portion of that circuit is housed within the remote cabinet 26. Broken lines 19 define a box which diagramatically represents a group of freezers or refrigeration units in the vicinity of the main cabinet. Spaced wavy lines 33 and 34 indicate the limits of the circuit within the two cabinets and are also intended to designate transmission lines of some length.

Referring now to the upper portion of FIGURE 3, the numeral 35 designates a source of alternating current which is impressed across the primary winding of a transformer 36. The transformer is provided with two secondary windings 36a and 36b. Winding 36a is a low voltage winding and is part of a general warning circuit designated by numeral 37. The warning circuit also includes a switch 38 in series with winding 36a, a light bulb 22 and relay contacts 39 closed by relay pole 40. The switch 38 is normally closed so that bulb 22 will burn whenever transformer 36 is energized and the relay contacts 39 are closed, the relay pole then being in the normal position represented by a solid line. Disposed in parallel about bulb 22 is the buzzer 23 which is energized when the relay pole 40 swings into the broken line position designated by the numeral 40a. Thus, circuit 37 provides an alternative signal depending upon the operative condition of the units being monitored, the light bulb 22 glowing when the units are functioning properly and the buzzer 23 giving an aural signal in place of the visual signal from the bulb whenever a unit is inoperative. It will be noted that when switch 38 is closed the illumination of bulb 22 informs the store owner or manager that transformer 36 is in proper operating condition and that there has been no failure of any of the refrigerating units.

The circuit responsible for the change in signal emanating from circuit 37 is designated generally by the numeral 42 and includes as its source of power secondary winding 36b. This circuit includes essentially two parallel sub-circuits 43 and 44. Sub-circuit 43 has as an important element thereof a cold cathode thyratron tube 45 through which alternating current derived from secondary winding 36b is sent. Current from winding 36b flows through a variable cathode resistor 46, plate resistor 47, condenser 48 and thyratron 45 whenever the thyratron grid receives an appropriate signal from circuit 44. The grid of the thyratron receives a signal from sub-circuit 44 whenever one or more of the units being monitored is in an inoperative condition. When all of the units are functioning properly, no signal is placed upon the grid and the thyratron is in an inoperative condition. With no current flowing through the thyratron, relay 49, which is in parallel with condenser 48, is also not energized. Flow of current through the thyratron tube energizes the relay to move relay pole 40 from the solid line position shown to the dotted line position indicated by the numeral 40a.

The sub-circuit 44 which is responsible for delivering a signal to the grid of the thyratron includes a plurality of sensing circuits each of which includes a thermostat designated by the numerals 1a–7a, glow tubes 1–7 and load resistors 1b–7b. Each of the sensing circuits is coupled to a rectifier 50 which is arranged in parallel with grid resistor 51. Whenever one or more of the thermostatic switches 1a–7a are closed due to the failure of the freezer units with which they are associated, rectified current flows through the particular sensing circuit causing the corresponding neon glow tubes 1–7 to illuminate and impressing a positive potential on the grid of the thyratron causing it to fire and thereby energizing the buzzer 23.

Thermostat 7a is equipped with a by-pass switch 52 which permits the simulation of a refrigeration failure in order to test the operability of the thyratron and the warning circuit 37 including buzzer 23.

Energization of relay 49 by thyratron 45 also closes a second relay pole 41 which couples secondary winding 36b with the circuit 53 housed within the remote cabinet 26. When relay pole 41 is moved under the influence of relay 49 (which simultaneously moves pole 40), current from transformer 36b is rectified by rectifier 54 and is filtered by condenser 55 and variable resistor 56. The direct current thus produced is sent through transmission lines 34 to circuit 53. Interposed between rectifier 54 and transmission lines 34 is a remote line test circuit designated generally by the numeral 57. Circuit 57 includes a switch branch 58 and two reporting branches 59 and 60 arranged in parallel. Normally, the switch 58a of branch 58 is closed, shunting out the reporting branches 59 and 60. When the transmission lines are to be tested, switch 58a is opened, thereby directing current through reporting branches 59 and 60 each of which includes a variable load resistor 59a and 60a respectively, and neon glow tubes 24 and 25. Load resistor 59a is so adjusted that whenever switch 58a is open and the transmission line 34 is in operative condition, glow tube 24 will light. At the same time, glow tube 25 will remain unlit because of the setting of load resistor 60a. However, load resistor 60a is so adjusted that tube 25 will glow whenever transmission line 34 is shorted between circuit 57 and circuit 53. Thus, before placing the remote cabinet in an alert condition, the operator may test to see whether the transmission lines coupling the remote unit with the main unit are completely operative and without short. For this purpose, however, it is necessary that the thyratron be firing so as to energize relay 49. This is brought about, as pointed out above, by closing switch 52 which simulates a failure of operation in one of the units monitored.

When the thyratron is not firing, no energy is transmitted from transformer 36 through the transmission lines to circuit 53. Upon the firing of the thyratron, a direct current is sent through lines 34 to a visual warning sub-circuit 61 of remote circuit 53. The sub-circuit includes a load resistor 61a and a neon glow tube 30 arranged in parallel with a condenser 61b.

The arrangement of elements in sub-circuit 61 results in a flashing or intermittent glowing of tube 30 when the circuit is completed. The flashing of the tube results from the fact that its firing potential is below the potential developed by secondary winding 36 and rectifier 54 but above that available across the tube when current is flowing through it and load resistor 61a. The provision of condenser 61b lengthens the period between successive firing of the tube 30 since, in the absence of this condenser, there would be an almost imperceptible glowing of the tube due to the rapidity with which it would fire and cease firing.

Arranged in parallel with sub-circuit 61 is an aural warning sub-circuit 62 which includes relay contacts 63, 64 normally closed by relay pole 65, and a relay 66 arranged in series therewith. Relay 66 when energized shifts its relay pole 66a from the position represented by a solid line to the dotted line position, thereby applying alternating current to a step-down transformer 67 and buzzer 32.

After the buzzer 32 has been energized and has warned of a refrigeration unit failure, its operation may be interrupted through the use of a third sub-circuit 69 within circuit 53. Sub-circuit 69 includes a push button switch 29 which is normally open but which, when depressed, remains closed until the flow of current therethrough is interrupted. Disposed in parallel with each other and in series with switch 29 are relay 65a and glow tube 31. The glow tube is equipped with a load resistor 31a. Momentary depression of switch 29 energizes the relay 65a which in turn shifts the relay pole 65 to the alternative broken-line position and thereby de-energizes relay 66 and buzzer 32. Since the relay pole in its alternative position carries current to the relay, the relay will remain energized even though the push button switch 29 is released. The closing of push button switch 29 energizes glow tube 31 so that the remote cabinet will have two lights glowing, one intermittently and the other steadily. The steady light provides an additional visual warning in place of the previously given aural warning, and, like flashing light 30, its operation is discontinued when current no longer flows through the transmission lines to circuit 53.

It is believed that the following summary of the sequence of operation will be additionally helpful in understanding the present invention:

When the temperature in any of a plurality of freezer units monitored by the thermostats rises above a dangerous or pre-established level, the thermostat in the defective unit closes, applying voltage to the sensing circuit. For example, if thermostat 1a closes, voltage is applied to the sensing circuit of which the thermostat is a part, including neon bulk 1, limiting resistor 1b, grid resistor 51 and rectifier 50. This applies a positive voltage to the grid of thyratron 45 causing it to conduct and energize relay 49. Relay poles 40 and 41 move into their alternative positions wherein pole 41 applies alternating current from transformer 36 to the rectifier system including rectifier 54, condenser 55 and resistor 56, while pole 40 (in its alternative position 40a) de-energizes the lamp 22 and applies an alternating current to the local alarm buzzer 23.

In the remote warning system, direct current voltage is applied through the transmission lines through relay pole 65 to relay 66 which energizes buzzer 32. The voltage is simultaneously applied to the relaxation components in circuit 61 resulting in a flashing signal from tube 30. After the warning signal has been received in the remote location, such as the home of the store owner, operation of buzzer 32 may be discontinued by depressing button 29 which applies voltage to relay 65a and the remote signal lockout indicator tube 31. The normally open contact now closed by relay pole 65 remains closed until interruption of the direct current supplied from the main unit. The remote cabinet 26 is left with only a flashing alarm light operating and a signal-locked-out-indicator light on. When the refrigeration difficulty is corrected, or when the current to the remote unit is otherwise interrupted by manipulation of switch 27 or switch 28, the biased relay pole 65 returns to its original solid-line position and the remote unit is thereby automatically reset.

Particularly satisfactory operation of the circuits herein described can be achieved when switches 52, 38 and 58a are coordinated. This is accomplished through the multiple position test switch indicated by the numeral 28 in FIGURE 1. In one position of switch 38, the warning circuit is in normal operation with switch 52 open and switches 38 and 58 closed. In another position, the switch provides for local indication only, with switches 38 closed while switches 52 and 58a are open. In still another position the structure is placed in a signal-off condition by opening all three switches. In a fourth position of switch 28, switch 52 is closed while switches 58a and 38 are open for testing the transmission line to the remote unit 26. In a fifth position, for testing the remote signal unit, switches 52 and 58a are closed while switch 38 is open. Thus, by swinging the multiple position switch into different positions, the different components of the signal system may be easily and quickly checked to assure the user of their operative condition.

An important aspect of the present invention lies in the dependability and reliability of the system. When there is no malfunctioning of the refrigeration units, only the transformer 36 and the secondary circuit 36a are active, with only a very small load imposed by neon glow lamp 22, which provides a continuous indication of the operativeness of the transformer. All of the other elements of the system remain inactive until a refrigeration difficulty occurs, or until they are checked by manipulation of test switch 28. The inactivity of these elements under ordinary conditions, as well as the means for readily checking their operability, results in a particularly dependable alarm system for detecting and registering refrigeration breakdown. In addition, the relatively long life and low current requirements, of the glow tubes make them extremely effective as the visual indicating means of the combination. The thyratron tube, activated by the low current of the sensing circuits, insures positive operation of the aural signal devices of both the local and remote circuits by, in effect, amplifying the signal carried by the sensing circuit.

To further aid those skilled in the art in the practice of this invention the following specific example is given:

EXAMPLE

The neon glow tubes or bulbs employed in the various circuits and designated by the numerals 1–16, 24, 25, 30 and 31 can be NE51 tubes. The thyratron can be a WL5823. Transformer 36 can be equipped with 110 volt primary and secondary windings rated at 6.3 volts (36a), and 125 volts (36b). Transformer 67 can have 110 volt primary and a 6.8 volt secondary winding. Rectifier 50 can be a 260 volt selenium rectifier and rectifier 54 can be another selenium rectifier rated at 130 volts. Thus, the circuit elements in circuit 53 should be rated for about 110 volts D.C. The various resistors and capacitors employed are set forth in the following table:

Table

| Resistor numeral: | Rating |
|---|---|
| 1b–7b | 47,000 ohms, ½ watt. |
| 46 | 1,500 ohms, 10 watts. |
| 47 | 1,200 ohms, 2 watts. |
| 51 | 680,000 ohms, 1 watt. |
| 56 | 50,000 ohms, 10 watts. |
| 59a and 60a | 2 megohms potentiometers. |
| 61a | 1.5 megohms, ½ watt. |
| 31a | 39,000 ohms, ½ watt. |
| Capacitor Numerals | |
| 48 | 10 microfarads, 150 volts. |
| 55 | 40 microfarads, 450 volts. |
| 61b | 25 microfarads, 200 volts. |

While in the foregoing specification an embodiment of the invention has been set forth in considerable detail for completely describing the invention, it will be apparent to those skilled in the art that numerous changes may be made without departing from the spirit and principles of the invention.

I claim:

1. A high temperature detection and alarm system for a group of refrigeration units comprising a sensing circuit including a plurality of normally open thermostatic switches each disposed within one of a group of refrigeration units and being adapted to close when the temperature in any of said units exceeds a predetermined maximum temperature, a plurality of signal devices arranged in series with said thermostatic switches and each being adapted to emit a warning signal when the switch in series connection therewith is closed, a local warning circuit coupled to said sensing circuit and including normally energized electric visual signalling means for continuously indicating the operability of the system, a remote reporting circuit coupled to said sensing circuit and having a signal device disposed in a location remote from said group of refrigeration units, and a single relay coupled to said sensing circuit and interposed in the coupling of said sensing circuit with said local warning and remote reporting circuits, said relay being actuated by the completion of said sensing circuit when any of said thermostatic switches are closed and being operative upon actuation to complete said remote reporting circuit and to interrupt said local warning circuit.

2. The structure of claim 1 in which there is also a normally open local reporting circuit including an aural signalling device, said local reporting circuit being closed by said relay to sound an audible local alarm when the relay is actuated by completion of said sensing circuit.

3. The structure of claim 1 in which said normally energized electric visual signalling means comprises a normally energized electric bulb.

References Cited in the file of this patent
UNITED STATES PATENTS

| 1,244,332 | Hughes | Oct. 23, 1917 |
| 2,351,587 | Derby | June 20, 1944 |
| 2,762,034 | Joyce | Sept. 4, 1956 |